(12) United States Patent
Conley

(10) Patent No.: US 7,133,509 B1
(45) Date of Patent: Nov. 7, 2006

(54) METHOD AND SYSTEM FOR CHARGING A SET ACTIVATION FEE FOR PAY TELEPHONE USAGE

(75) Inventor: W David Conley, Homewood, AL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/475,531

(22) Filed: Dec. 30, 1999

(51) Int. Cl.
H04M 17/00 (2006.01)
H04M 15/00 (2006.01)

(52) U.S. Cl. .............. 379/144.01; 379/143; 379/114.2; 379/127.02; 379/127.03

(58) Field of Classification Search ................ 379/111, 379/112.01, 114.1, 114.14, 114.15, 114.19, 379/114.2, 126, 127.01, 127.02, 127.03–127.04, 379/133–134, 143, 144.03, 144.05, 144.06, 379/144.07
See application file for complete search history.

(56) References Cited

U.S. PATENT DOCUMENTS

| 4,517,411 | A | * | 5/1985 | Casner |
| 4,897,870 | A | * | 1/1990 | Golden |
| 5,745,884 | A | * | 4/1998 | Carnegie et al. |
| 5,748,717 | A |   | 5/1998 | Chan et al. |
| 5,850,432 | A | * | 12/1998 | Desai et al. ........... 379/114.29 |
| 6,020,980 | A | * | 2/2000 | Freeman |
| 6,188,752 | B1 | * | 2/2001 | Lesley |
| 6,222,912 | B1 | * | 4/2001 | Breuer .................. 379/114.24 |
| 6,320,947 | B1 | * | 11/2001 | Joyce et al. |
| 6,351,453 | B1 | * | 2/2002 | Nolting et al. |
| 6,430,277 | B1 | * | 8/2002 | Roadifer et al. ....... 379/127.02 |

* cited by examiner

Primary Examiner—Quoc Tran
(74) Attorney, Agent, or Firm—Cantor Colburn LLP

(57) ABSTRACT

A set activation fee pay telephone permits a telephone customer to place a telephone call from a pay telephone if the customer presents valid billing information, and charges the customer a fixed fee for the call, plus any other applicable network charges. The set activation pay telephone accepts two inputs: a telephone number the customer desires to call and billing information. The set activation fee pay telephone stores the telephone number locally and transmits the billing information to a network element. A determination is made as to whether the billing information is valid. Typically, the determination is made by querying a billing database. If the billing information is valid, then an approval signal is transmitted to the set activation fee pay telephone. Once the set activation fee pay telephone receives the approval signal, it passes the telephone number stored in memory to the PSTN and the call is placed normally. Once the customer terminates the call, a set activation fee is added to the customer's bill reflecting the cost for the use of the set activation fee pay telephone in addition to any other applicable network charges.

10 Claims, 2 Drawing Sheets

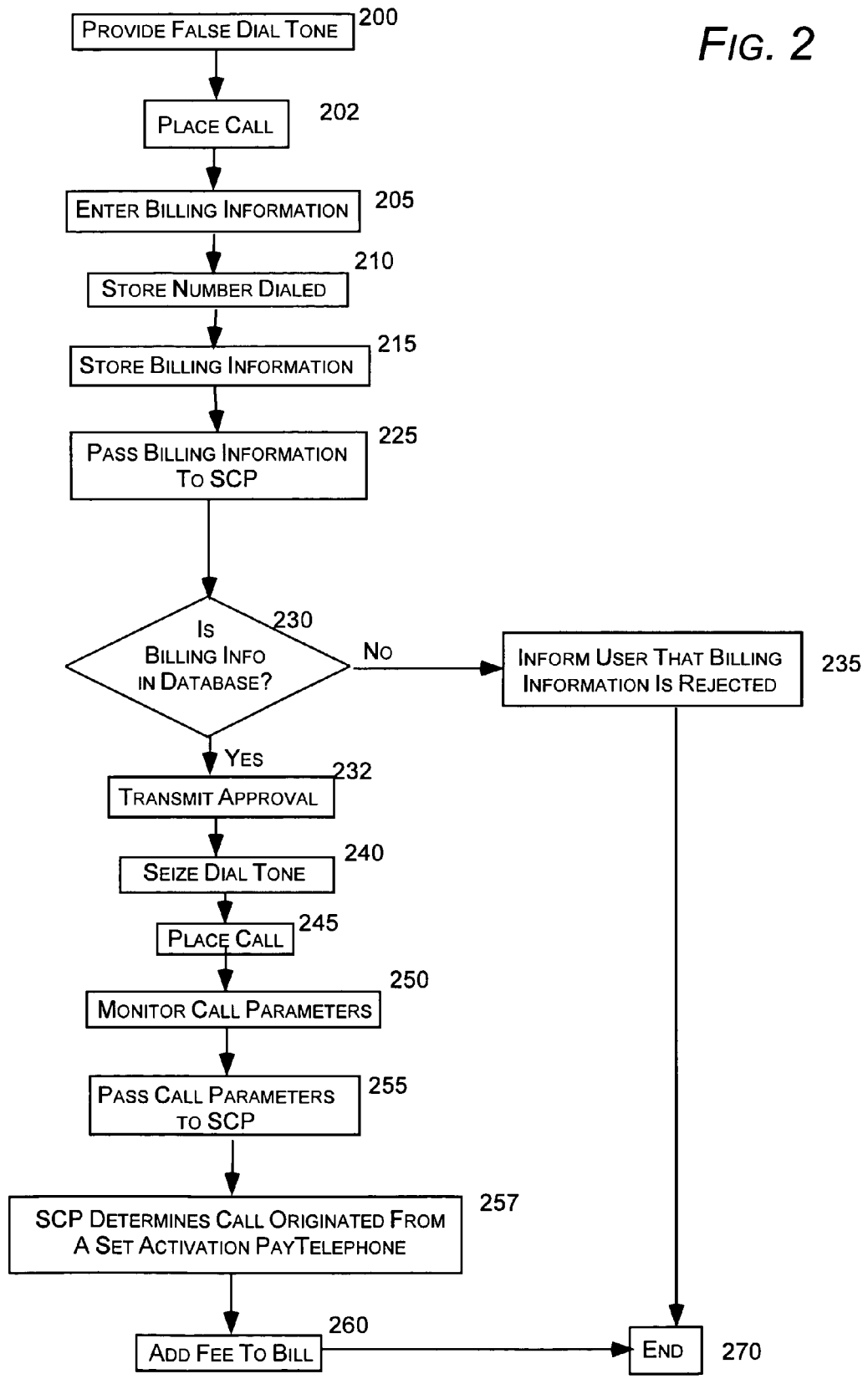

METHOD AND SYSTEM FOR CHARGING A SET ACTIVATION FEE FOR PAY TELEPHONE USAGE

TECHNICAL FIELD

The present invention relates to the field of telephony, and more particularly to a method for charging a set activation fee to a pay telephone customer calling from a remote area.

BACKGROUND

In today's society, the telephone is a common instrument. People use telephones to communicate in many different environments. Indeed, the telephone is nearly omnipresent and used by millions of people. Even public locations typically have a pay telephone within easy walking distance to provide access to the public switched telephone network.

However, providing land-line based telephone service to certain remote locations is not economically feasible. The cost of installing a pay telephone includes running a line, setting up a local switch, and installing the actual pay telephone. Sometimes these costs drastically exceed the potential revenues of the pay telephone. Typically, the provider of a pay telephone receives only a nominal fee for each call placed from the pay telephone. If the installation of a pay telephone is not economically feasible, then there is no incentive to provide pay telephone service at the remote location.

Current solutions to this problem remain unsatisfactory. Cellular technology suffers from problems similar to land-line based telephony. The cost of erecting cellular transmission towers may also be too expensive to justify providing service. Microwave connections require sophisticated, specialized equipment. This leaves service providers with no options for extending coverage to all those who desire pay telephone service.

For example, providing telephone service to an oil derrick at sea may be economically prohibitive. The derrick would not only require a telephone but a transmission path to the Public Switched Telephone Network (PSTN). The number of telephone calls placed from the derrick using traditional billing methods would never generate enough revenue to pay for the cost of providing the pay telephone service in this example. Other remote locations suffer similar problems. These problems persist in any environment where significant expenditures are required to provide service.

Thus, there is a need in the art for an economically feasible method to provide pay telephone service to even the most isolated locations. There is a further need in the art for a system which allows a service provider to recoup the costs of providing access to a public switched telephone network via a pay telephone.

SUMMARY OF THE INVENTION

Generally stated, the invention provides a system and method for charging a set activation fee for a telephone call. A set activation fee pay telephone permits a telephone customer to place a telephone call from the telephone if the customer presents valid billing information. The set activation fee pay telephone charges a predetermined fee to the customer's telephone bill or other bill, if the customer presents valid billing information, or deducts the fee from value present on a stored value card. When a customer picks up the set activation fee pay telephone's handset, a false dial tone is generated. To the customer, the false dial tone is indistinguishable from the dial tone generated by the PSTN.

The set activation pay telephone accepts two inputs: a telephone number the customer desires to call and billing information. The billing information may consist of a credit card number, a smart telephone card, a calling card, or other approved information. The set activation fee pay telephone stores the telephone number locally and transmits the billing information to a network element, such as a service control point (SCP) which could include a Line Identification Database (LIDB).

In one embodiment, the SCP maintains a billing database containing the billing information approved for use with the set activation fee pay telephone. Upon receipt of a customer's billing information from the set activation fee pay telephone, the SCP determines whether any billing database entry matches the billing information. If an entry corresponds to the billing information, the SCP transmits an approval signal to the set activation fee pay telephone. Otherwise, the SCP transmits a denial signal and a message is played to the customer informing him that the call may not be placed.

Once the SCP approves the billing information, the set activation fee pay telephone releases the false dial tone and seizes the dial tone generated by the public switched telephone network. The pay telephone then passes the called telephone number stored in memory to the PSTN, and the call is placed normally. The set activation fee pay telephone monitors the call parameters while the telephone call is in progress, including the length of the call, the time of the call, and the call destination. Once the customer terminates the call, the set activation fee pay telephone stores the call parameters for use in billing the call. At predetermined intervals, the set activation fee pay telephone collates and transmits the call parameters to a network element, such as the SCP, or to a billing agent's database. A network element, such as an SSP or a billing agent then computes the total charge for the call and adds the call cost to the customer's bill, along with a set activation fee reflecting the cost for the use of the set activation fee pay telephone.

The present invention satisfies the identified needs by providing a method for a service provider to add a set activation fee to any telephone calls made from a set activation fee pay telephone. By adding a set charge to a telephone call placed from a set activation fee pay telephone, regardless of the length of the call or other call-variant factors, a service provider may defray the costs of providing service to a public switched telephone network.

BRIEF DESCRIPTION OF THE DRAWINGS

FIG. 2 is a logic flow diagram illustrating a method for charging a pay telephone customer a set activation fee.

DETAILED DESCRIPTION

Figure 1:
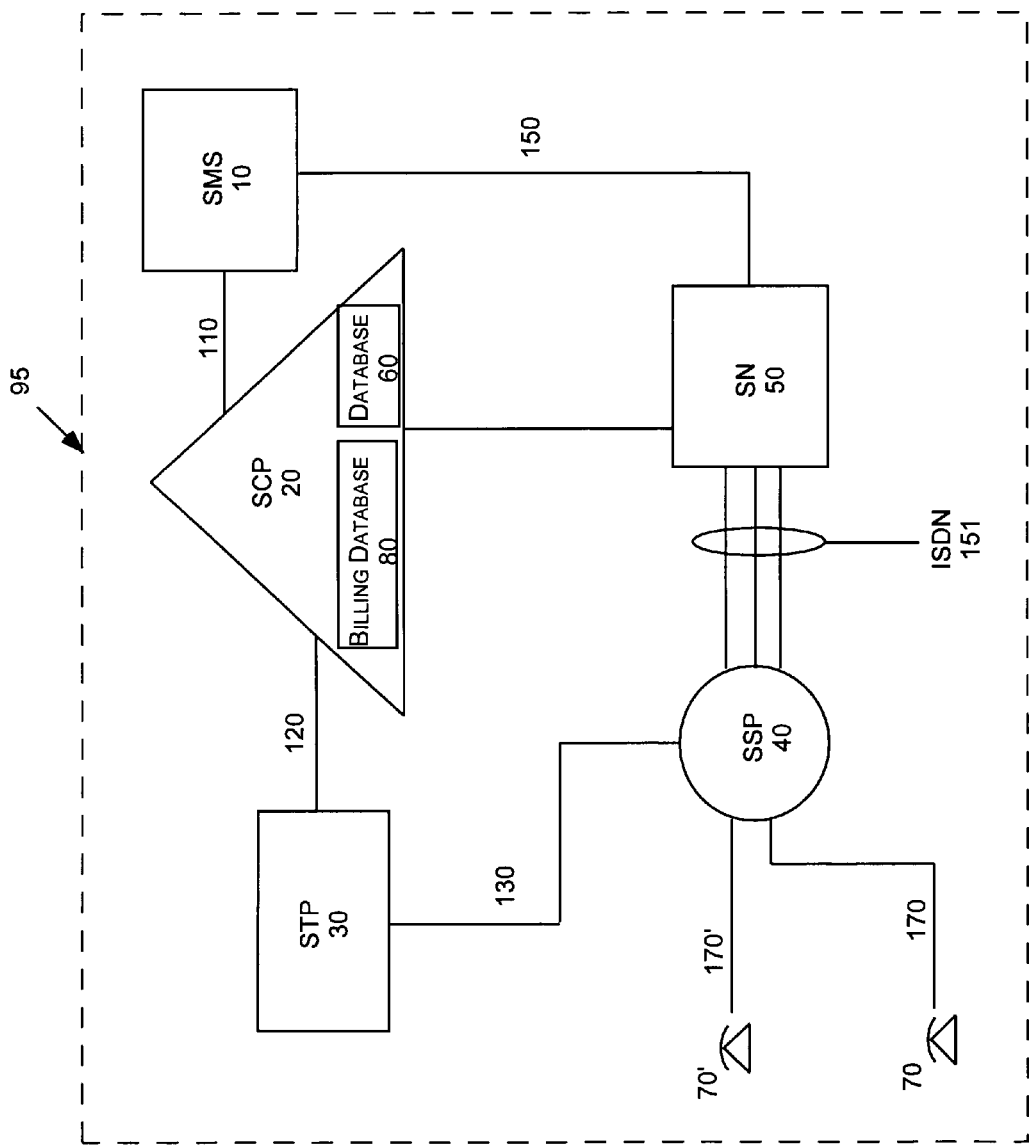
FIG. 1 displays a portion of a public switched telephone network.

The present invention permits a telephone service provider to offset costs incurred to provide pay telephone service to remote locations by charging a set activation fee to a customer. A set activation fee is a flat fee charged to a customer, regardless of call type, in order to offset a portion of the cost of providing telephone service. The set activation fee is charged for operator-assisted or toll-free calls, as well as regular telephone calls. Briefly described, the invention validates billing information prior to placing a telephone call and charges a set activation fee for each call placed and completed. In one embodiment, the invention utilizes a set activation fee pay telephone that will not place a telephone call unless valid billing information is presented by the user.

A customer initiates a telephone call from a set activation fee pay telephone by dialing a telephone number associated with a terminating element such as a telephone, cellular telephone, or modem, and inputting billing information. The set activation fee pay telephone stores the dialed telephone number and forwards the billing information for validation. A network element receives the billing information, and determines whether the billing information is valid. For example, the billing information can be validated by determining whether the billing information is present in a database of preapproved billing information.

Once the set activation fee pay telephone receives the approval signal, it accesses the public switched telephone network and places a telephone call to the telephone number the customer dialed. At the termination of the telephone call, the set activation fee pay telephone stores the call parameters for transmission to the network element that provides billing capability. At some predetermined interval the call parameters are transmitted to a database associated with the network element, at which time the set activation fee is added to the customer's bill.

Operation of a Store and Forward Telephone

A store and forward telephone is well-known to those skilled in the art of telephony. Current store and forward pay telephones perform a store and forward operation only in response to "zero-plus" dialing. Zero-plus dialing occurs when a customer places a telephone call by dialing zero, plus a telephone number. A store and forward operation is not performed when a customer places a telephone call by dialing a toll-free number, such as an 800 number. A store and forward telephone prompts the customer to enter credit card information or other billing information in order to bill the cost of the telephone call to a valid account.

The store and forward telephone stores both the dialed number and the billing information, and transmits the billing information for validation. If the billing information is validated, an accept response is transmitted to the store and forward telephone. Otherwise, a rejection response is transmitted and the store and forward telephone terminates the telephone call. If the store and forward telephone receives an accept response, then the telephone call is placed and the cost of the telephone call is added to the caller's account.

In one embodiment, a modified store and forward telephone may be used to implement the present invention. Specifically, a modified store and forward telephone performs a store and forward operation for all calls placed from the telephone. Additionally, the modified store and forward telephone is identified as a set activation fee pay telephone.

Description of the Exemplary Operating Environment

Referring now to the drawings, in which like numerals indicate like elements throughout the several figures, the embodiments of the present invention will be described below with reference to the appended drawings. Generally, FIG. 1 illustrates the operating environment of an embodiment of the present invention. FIG. 2 illustrates the logical operation of an embodiment of the present invention.

FIG. 1 is a diagram depicting a representative portion of the public switched telephone network (PSTN) 95. Generally, the public switched telephone network is comprised of a variety of interconnected computer systems. The representative portion of the public switched telephone network 95 in FIG. 1 comprises a Service Management System (SMS) 10, a Service Control Point (SCP) 20, a Service Transfer Point (STP) 30, Service Switching Point (SSP) 40, and a Service Node (SN) 50. The SMS 10 performs the high-level operations of the telephone network. The functions of the SMS 10 include: (a) downloading information to SCP 20 databases, such as database 60 when new subscribers are added or subscribers modify their ensemble of services; (b) performing data reloads when a SCP 20 crashes or software needs to be updated; (c) implementing high volume routing services, such as call forwarding and 800 number translation and routing; (d) maintaining and providing access to high volume databases for the authorization of billing, such as credit card number validations; and (e) downloading, on a non-real-time basis, billing information that is needed in order to appropriately invoice telephone company subscribers for the services provided.

The SCP 20 and the SMS 10 are interfaced over a digital data link 110. The SCP 20 operates in the telephone network to maintain a network database 60 that stores subscriber information. The subscriber information supports enhanced services, such as call forwarding. The SN 50 and the SMS 10 are interfaced over a digital data link 150. An SSP typically interfaces to an SN via an ISDN link such as ISDN link 151 between SSP 40 and SN 50. However, the present invention does not require an ISDN link between the SSP and the SN. Generally, SSPs operate by transmitting signal messages or queries to other components and by receiving and processing response messages from the other components. A signal message indicates an event or a state change has occurred at an SSP. When a set of predetermined conditions are detected, the SSP 40 operates to (a) initiate a signal associated with the specific call processing state for the present call on a subscriber line, (b) generate and transmit an appropriate query message to another network component, and (c) suspend call processing for the present call until a response is received from the component. The received response message instructs the SSP 40 to take certain actions in processing the present call. If the SSP 40 does not receive a response from the network component, a default task will be executed upon the expiration of a default timer.

Additionally, the SSP 40 typically generates a billing record for each terminating element attached thereto in a manner well-known to those skilled in the art. Briefly, the SSP 40 creates pre-communication accounting records for communications originating on the subscriber line 170. Each of these accounting records typically includes the subscriber's directory number, the terminating station directory number, and the duration of the telephone call placed from the terminating element on the subscriber line and a terminating station. The accounting records created by the SSP 40 for the subscriber line 170 are periodically downloaded to a billing system on a non-realtime basis. The billing system (not shown) then computes the costs for the communications represented by the various accounting records and prepares billing statements to be mailed to the subscriber.

SSPs may also be connected to each other via a trunk circuit (not shown). The trunk circuits provide the physical voice paths between parties. Each SSP 40 services several subscriber lines. SSP 40 is shown as interfacing with termination equipment 70 and 70' via subscriber lines 170 and 170'. STPs in the network are utilized in linking the SSPs to the SCP 20s. In FIG. 1, SCP 20 interfaces to STP 30 via digital data line 120 and STP 30 interfaces with SSP 40 via digital data link 130. Digital data packets flowing between the SCP 20 and the SSP 40 goes through STP 30. Thus, the STP 30 is not normally the destination of a packet, but merely directs traffic among the other entities on the network that generate and respond to the data packets. The public switched telephone network 95 can also interface to a non-SSP switch, a cellular network, or a private telephone system.

It should be noted that the preferred operating environment of the present invention is not limited to the relatively simple configuration shown in FIG. 1. Rather, FIG. 1 shows an illustrative portion of the PSTN 95 sufficient to describe an embodiment of the invention and its operation. Many other network elements and interconnections, including SSP and non-SSP switches for servicing other pieces of terminating equipment (for example, cellular telephones) are not shown in FIG. 1, but will be understood to be appropriate for use with the present invention.

Charging a Set Activation Fee

Continuing with FIG. 1, an exemplary embodiment of the present invention is discussed. Set activation fee pay telephone 70 is connected to the public switched telephone network 95 via a standard subscriber line 170. When a customer initially picks up the handset of the set activation fee pay telephone 70, the telephone does not relay the dial tone generated by the PSTN 95. Instead, the set activation fee pay telephone 70 simulates a dial tone. This is referred to as a false dial tone, because the tone is provided by the set activation fee pay telephone, rather than the PSTN. The false dial tone is generated in order to fulfill the customer's expectation that a dial tone will be present upon picking up the handset.

So long as the set activation fee pay telephone 70 plays a false dial tone, no telephone calls may be placed. In order to access the PSTN 95 from the set activation fee pay telephone 70, a customer must enter both a telephone number and billing information, in a manner similar to placing a call with a calling card. Optionally, the set activation fee pay telephone 70 may provide voice prompts to assist a customer in entering this information. Effectively, the pay telephone 70 is inactive and will not access the PSTN 95 until the telephone receives an approval and activation signal from a network element, such as the SSP 40. The billing information may comprise a calling card number, credit card number, or other information through which the network element may identify the caller and bill the caller the set activation fee for the use of the pay telephone. Alternatively, if the set activation pay telephone is equipped to process smart cards, then a smart card can be used and the billing transaction is completed by the set activation pay telephone without involvement of other network elements.

The set activation fee pay telephone 70 stores the telephone number in local memory storage and transmits the directory number for the set activation fee pay telephone and the billing information across a subscriber line 170 to the SSP 40. The SSP 40 then passes the billing information and the directory number associated with the set activation fee telephone to another network element responsible for maintaining a billing database 80. In FIG. 1, the billing database 80 is associated with the SCP 20. However, in alternate embodiments the database may be associated with other network elements, such as the SMS 30 or SSP 40. For example, the SSP 40 can maintain a billing database for set activation fee billing for all terminating elements connected to the SSP. It should be understood that these are representative network elements, rather than an exhaustive list of all network elements capable of maintaining the billing database 80. Alternatively, billing information may be stored in the set activation fee pay telephone itself, and then transmitted at periodic intervals to a final billing database.

Database 80 is associated with a network element, such as SCP 20, as illustrated by FIG. 1. Although not shown in FIG. 1, in an alternative embodiment the billing database 80 may be associated with the SMS 10 and receive periodic updates from the SCP 20 or SSP 40. The billing database 80 differs from the database 60 described above insofar as the billing database 80 stores records of billing information preapproved for use with a set activation fee pay telephone 70 and a list of all telephones configured to charge a set activation fee. Alternatively, billing database 80 could be split into two separate databases. The first database may store billing information records, while the second may store a set activation fee pay telephone list. As will be apparent to those skilled in the art, the billing database 80 (or a portion of the database) could be combined with an existing database in a network element.

Billing information is preapproved if the service provider can verify that it may bill an account associated with the billing information for use of the pay telephone. Examples of billable accounts include valid credit card accounts, telephone billing accounts for valid calling card accounts, and other accounts that will be readily apparent to those skilled in the art. Generally, an account is valid if the account is active and meets certain pre-defined criteria.

When a telephone call is placed from a set activation fee pay telephone 70, the network element determines whether the billing information is present in the billing database 80. If the network element finds a corresponding entry for the billing information in the billing database 80, then the network element transmits an approval signal to the set activation fee pay telephone 70. Upon receipt of the approval signal by the set activation fee pay telephone, the SSP 40 releases call processing capabilities for the set activation fee pay telephone 70. The SSP then relays the approval signal to the pay telephone 70.

In response to receipt of the approval signal, the set activation fee pay telephone 70 accesses the PSTN 95, playing a "true" dial tone generated by the PSTN. Once the true dial tone is accessible, the pay telephone 70 retrieves the telephone number from memory storage and places a telephone call to the number. During the telephone call, the set activation fee pay telephone 70 monitors various call parameters, including call length, call origination time, and the number called. Upon call termination, the set activation fee pay telephone 70 stores the call parameters. The set activation fee pay telephone transmits the stored call parameters to billing database 80 or another external billing database at a predetermined interval. The billing database creates a record that may be used to compute the total cost of the telephone call. Alternately, the set activation fee pay telephone 70 may compute the total cost of the telephone call and transmit this information directly to the billing database 80. The network element or the set activation fee pay telephone adds the call charge to the customer's account, and adds a separate line item to the bill called a "set activation fee." The set activation fee is a fixed charge assessed to a caller reflecting the cost of providing service from the telephone's location. This fee does not vary with any of the call parameters listed above, but instead is always the same set amount. Note that this amount may vary by telephone. For example, the set activation fee associated with a first set activation fee pay telephone at a first location may be different than the set activation fee associated with another set activation fee pay telephone at a second location, because the cost of providing service to the first location is different than the cost for providing service to the second location.

Optionally, the network element may not charge a customer anything for the call itself based on the call parameters, but will always charge the set activation fee. For example, a telephone call may be placed from a set activation fee pay telephone 70 using a toll-free telephone number. In this event, the network element may not assess any call charges based on the location called or length of the call. Nonetheless, the set activation fee is still charged, insofar as the set activation fee reflects the cost of providing telephone service to the pay telephone itself.

Flowchart of Steps for Charging a Set Activation Fee

FIG. 2 displays a flowchart detailing the steps executed when placing a telephone call from a set activation fee pay telephone 70. The method begins in step 200, wherein the set activation fee pay telephone provides a false dial tone to the customer. Following step 200, step 202 is accessed.

In step 202 a customer places a telephone call from the set activation fee pay telephone by dialing a directory number associated with a terminating unit. The set activation fee pay telephone issues a prompt for billing information entry. Next, in step 205 the customer enters the customer's billing information. Typically, the billing information consists of a credit card number, telephone smart card number, or calling card number, although other types of billing information also may be used. For example, if the set activation fee pay telephone includes a card reading device, then the customer can "swipe" a card through the card reading device to provide the billing information.

In step 210, the pay telephone 70 stores the billing information and dialed telephone number in internal memory. The set activation fee pay telephone 70 plays an announcement (for example, "Thank you for using Bell-South") to a customer while the billing information is passed to the PSTN and validated, as described in steps 225 through 235.

In step 225, the pay telephone transmits the billing information to the SSP 40, which in turn transmits the billing information to the SCP 20. The exemplary SCP 20 shown in FIG. 1 includes a database containing the billing information which may be used with the invention. Although the SCP 20 carries out the following steps in the embodiment depicted on FIG. 2, alternative embodiments may have various network elements perform these functions, as discussed with respect to FIG. 1.

Following step 225, step 230 is entered. In step 230, the SCP 20 determines whether the billing information matches an entry in the database. If it does, then the customer's billing information is approved for use with the set activation fee pay telephone, and step 232 is entered. If the SCP 20 does not find a matching entry, then the billing information is invalid and step 235 is accessed.

In step 235, the pay telephone 70 plays a message to the customer stating that the billing information is invalid, and that the call may not be placed. Once this message is played, end step 270 is accessed.

In the event that the SCP 20 found an entry corresponding to the billing information in the database, then step 232 is entered. In step 232, the SCP 20 transmits an approval signal to the pay telephone 70. This approval signal instructs the pay telephone to release the false dial tone and seize a true dial tone from the PSTN, as shown in step 240.

Once the true dial tone is seized in step 240, the set activation fee pay telephone 70 places the call across the PSTN in step 245. Following the call placement, step 250 is entered. In step 250, the set activation fee pay telephone monitors the call parameters, such as the length of the call, the call destination, and the time of the call Alternatively, network elements may be used to monitor the call parameters. These parameters can affect the amount charged for the call. The pay telephone monitors these parameters until the call is terminated.

Termination of the telephone call initiates step 255. In step 255, the set activation fee pay telephone passes the call parameters to the SCP 20 via the SSP 40, as shown in step 255. Once the SCP 20 receives the call parameters transmitted in step 255, the SCP 20 computes the charge for the call. In an alternative embodiment, the SCP 20 may create a billing record used by another network element or a dedicated billing system to compute and bill charges. Although FIG. 2 illustrates that the call parameters are transmitted once the telephone call terminates, the call parameters can be stored and transmitted at predetermined intervals.

In step 257, the SCP 20 recognizes that the originating telephone number is associated with a set activation fee pay telephone 70.

Following step 257, the SCP adds the set activation fee to the customer's bill in step 260. Alternatively, the SCP 20 may transmit the billing record is to the network element responsible for billing charges to a caller's account. The network element in turn processes the billing record and changes a caller's account accordingly. As part of adding a charge to the customer's bill, the SCP 20 adds an additional line item reflecting a fee for the use of the set activation fee pay telephone 70. This fee is called the "set activation fee," and is broken out as a separate line item on the customer's bill. Alternatively, the set activation fee pay telephone 70 can compute the change for the call by adding the set activation fee to the cost of the telephone call. After step 260, end state 270 is entered.

CONCLUSION

The set activation fee pay telephone 70 may include additional functionality; for example, the telephone may store the billing information in local memory along with the dialed telephone number, or may be operative to accept a wider range of billing information than herein described. It should also be understood that the set activation fee pay telephone 70 and billing database 80 may be located in different regions of the PSTN 95, rather than within the same locality as shown in FIG. 1. In this event, STP 30 communicates with a different regional STP (not shown) and so on, until the region in which the SCP 20 is located is reached. Many other modifications and additional features will become evident in view of the preceding description of the embodiments of the invention. It should be understood, therefore, that the foregoing description relates only to certain embodiments of the invention, and that numerous changes may be made therein without departing from the spirit and scope of the invention as defined by the following claims.

I claim:

1. A method for providing access to a public switched telephone network by offsetting the service cost through charging a set activation fee, comprising:
   receiving billing information from a set activation fee pay telephone, the set activation fee pay telephone associated with an originating telephone number;
   determining whether the billing information is valid;
   if the billing information is valid, then providing a dial tone to the set activation fee telephone from the public switched telephone network if the billing information is valid;

causing a telephone call to be connected to a telephone number received from the set activation fee pay telephone;

identifying the telephone call as having the originating telephone number associated with the set activation fee telephone; and based on the identification, charging the set activation fee for the telephone call.

2. The method of claim 1, wherein identifying the telephone call as having the originating telephone number, comprises:

querying a database for the presence of the originating telephone number associated with the set activation fee pay telephone, the database comprising a plurality of originating telephone numbers associated with a plurality of set activation fee pay telephones; and if the query is positive, then determining that the telephone call originated from the set activation fee pay telephone.

3. The method of claim 2 wherein the database is associated with a Service Control Point (SCP).

4. The method of claim 1, wherein determining whether the billing information is valid comprises:

querying a database for the presence of the billing information, the database comprising a plurality of numbers associated with a plurality of entries associated with a plurality of valid billing accounts.

5. The method of claim 4 wherein the database is associated with a Service Control Point.

6. The method of claim 1, wherein the set activation fee is the same for every telephone call placed from the set activation fee telephone.

7. The method of claim 1 wherein:

determining whether the billing information is valid includes determining if an account is active, without determining the funds available.

8. The method of claim 1 further comprising:

adding the set activation fee and the charge for the telephone call to a customer bill.

9. A method for calculating a charge for a telephone call directed to a called telephone number, comprising:

monitoring a telephone call placed to the called telephone number to determine call parameters for the telephone call;

determining whether the telephone call originated from a telephone having an originating telephone number that corresponds to an entry in a database;

if so, then determining that a set activation fee applies to the telephone call; and calculating the charge for the telephone call by using the call parameters to calculate a first portion of the charge; and adding the set activation fee as a second portion of the charge by a network element, so that the set activation fee is independent of the first portion of the charge prior to placing the telephone call to the called telephone number, determining whether billing information for the telephone call is valid.

10. The method of claim 9, wherein the call parameters include call length, call origination time, and the called telephone number.

* * * * *